May 26, 1970 J. B. POPPER 3,513,954
SELF-LOCKING CLUTCH
Filed July 31, 1967 2 Sheets-Sheet 1

INVENTOR.
Jahlin Boas Popper
BY

May 26, 1970     J. B. POPPER     3,513,954

SELF-LOCKING CLUTCH

Filed July 31, 1967     2 Sheets-Sheet 2

INVENTOR.
Jakhin Boas Popper
BY

United States Patent Office 3,513,954
Patented May 26, 1970

3,513,954
SELF-LOCKING CLUTCH
Jakhin Boas Popper, Rehov Ranas 6,
Kiryat Motzkin, Israel
Filed July 31, 1967, Ser. No. 657,167
Int. Cl. F16d 11/06, 13/04, 23/00, 43/00
U.S. Cl. 192—41                                    8 Claims

ABSTRACT OF THE DISCLOSURE

The invention, in its most useful version, comprises a clutch connecting two shafts, such that the first shaft can drive the second shaft in either direction, but the second shaft is able to drive the first shaft in one direction only, producing self-locking in the other direction. The clutch can be used for freewheeling or overrunning, for indexing, and for backstopping applications. The two shafts are coupled by means of inclined wedge surfaces producing an axial force component which presses the first shaft against a thrust surface. By making this thrust surface of sufficiently large diameter and by selecting an appropriate angle for the wedge surfaces, self-locking is obtained.

---

The present invention relates to self-locking clutches, and particularly to clutches which are self-locking in only one direction of rotation, i.e., freewheeling or overrunning clutches.

Self-locking clutches are used where it is desired to connect two shafts in such a manner that the first shaft can drive the second shaft in any direction, but the second shaft cannot drive the first shaft. If the second shaft is unable to drive the first shaft in any direction, the clutch is completely self-locking. If, however, the second shaft is able to drive the first shaft in one direction only but unable to do so in the opposite direction, then a freewheeling or overrunning clutch is obtained.

In prior-art freewheeling devices, freewheeling is generally accomplished by means of ratchet mechanisms, but these can provide self-locking only in steps. In cases where stepless self-locking is required, clutches using a great number of either spring-loaded rollers or of so-called sprags have often been employed. These clutches require a great number of parts, frequently of intricate shape, and are thus inherently expensive to manufacture. In addition, they often suffer from excessive amount of backlash, and from high contact pressures at the roller surfaces (because of their inherent line contact), resulting in excessive wear.

An object of the present invention is to provide a self-locking clutch which consists of a minimum number of parts, and is extremely simple to manufacture.

A further object is to provide a clutch of the above type which is self-locking in only one direction, and is thus freewheeling or overrunning.

A further object is to provide a self-locking clutch which is stepless in operation, and which has virtually no backlash.

A further object is to provide a self-locking clutch which can be designed to have surface contact, instead of line contact, between its elements.

A further object is to provide a freewheeling clutch, in which the direction of freewheeling can easily be adjusted.

Further objects appear in the specification, drawings, and claims.

In the drawings, I have chosen to illustrate a few embodiments of the invention, choosing the forms shown from the standpoint of convenience in illustration, satisfactory operation, and clear demonstration of the principles involved.

Figure 1:
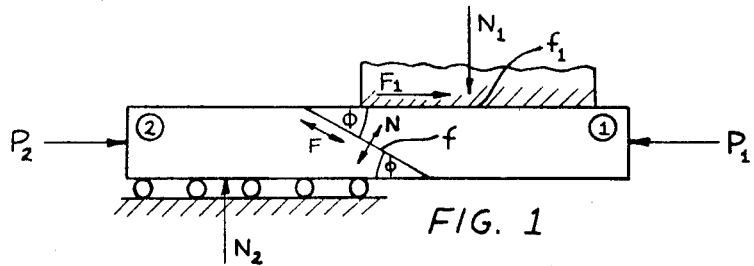
FIG. 1 is a diagram of two inclined planes or wedge surfaces moving in parallel paths, useful in explaining the principles of the invention.

Referring now to FIG. 1, two wedge bodies are moving along parallel paths, and are contacting each other at the inclined-plane surfaces with a coefficient of friction $f$ between them. The wedge angles of the inclined planes are both equal to $\phi$. Wedge 1 slides along a guide bearing with a coefficient of friction $f_1$ between them. As will be shown later, $f_1$ is not usually equal to $f$, but is in fact generally much larger. Wedge 2 is guided by a set of rollers which are practically frictionless. A driving force $P_1$ acts on wedge 1, while an opposing force $P_2$ acts on wedge 2.

The normal reactions between the various surfaces are denoted by $N$, $N_1$ and $N_2$ respectively. The friction force $F_1$ between wedge 1 and its guide equals $F_1 = f_1 N_1$. Assuming that the force $P_1$ drives wedge 1 in the direction of $P_1$, this friction force $F_1$ will act in the direction shown in FIG. 1. Similarly, the friction force $F$ between the two wedge surfaces equals $F = fN$. However, the direction of $F$ cannot be accurately predicted. Ideally, $F$ should be zero, since there should not be any relative motion between the two wedge surfaces. However, due to vibration, dimensional inaccuracies, and other factors, there may be a small amount of relative motion, so that this friction force $F$ may appear, although we cannot be certain of its direction. In order to be on the safe side, we shall assume that $F$ acts in that direction producing the less favourable result.

The friction coefficient $f$ defines a friction angle $\theta$=arc tan $f$ and similarly the friction coefficient $f_1$ defines a friction angle $\theta_1$=arc tan $f_1$. The vector diagram showing the various forces acting on the wedges of FIG. 1 is presented in FIG. 2. Here it is assumed that the friction $F$ acts in the direction pressing wedge 1 against its guide, so that the friction $F_1$ is increased. (If $F$ should act in the opposite direction, $\theta$ should simply be substituted for $\theta$ in the equations to follow.)

Figure 2:
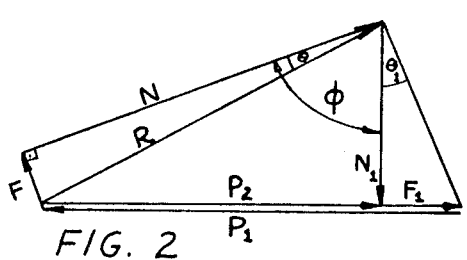
FIG. 2 is a vector diagram of the various forces acting on the wedges of FIG. 1, useful in deriving the equations that describe the invention.

From FIG. 2, it is seen that $$P_2 = R \sin(\phi \mp \theta) \tag{1}$$

where the minus sign applies if the friction F acts in the direction as described above and as shown in the figure. If F should act in the opposite direction, the plus sign would apply. FIG. 2 furthermore shows that $$P_1 = P_2 + F_1 = R \sin(\phi \mp \theta) + N_1 \tan \theta_1$$
$$= R \sin(\phi \mp \theta) + R \cos(\phi \mp \theta) \tan \theta_1$$
$$= \frac{R \sin(\phi \mp \theta + \theta_1)}{\cos \theta_1} \tag{2}$$

Provided that wedge 1 is the driver (Case I), the efficiency $e$ of the mechanism will be given by $$e = \frac{P_2}{P_1} = \frac{\sin(\phi \mp \theta) \cos \theta_1}{\sin(\phi \mp \theta + \theta_1)} \tag{3}$$

For the case where wedge 2 becomes the driver, and force $P_2$ moves the wedges in the direction of $P_2$ (Case II), FIG. 1 still applies, except that the friction force $F_1$ now acts in the opposite direction. Again, the direction of the friction force F is indeteminate. FIG. 2 could be redrawn, but the Equations 1, 2 and 3 for this case can be derived directly simply by changing the sign of $\theta_1$ wherever it appears in the equations. The efficiency $e$ for Case II is defined as $$e = \frac{P_1}{P_2} = \frac{\sin(\phi \mp \theta - \theta_1)}{\sin(\phi \mp \theta) \cos \theta_1} \tag{4}$$

As before, the sign of $\theta$ is negative if the friction force F acts to increase the friction force $F_1$, or positive is F acts to decrease $F_1$. The condition for self-locking is that the numerator of (4) becomes zero or negative. This means that $$\phi < \theta_1 \mp \theta \tag{5}$$

If condition (5) is fulfilled, wedge 1 will be able to drive wedge 2, but wedge 2 will not be able to drive wedge 1. Since the sige of $\theta$ is indeterminate, we must always assume the less favorable condition. Thus, if self-locking is not desired, we must make $\phi > \theta_1 + \theta$. However, if self-locking is required, as in the case of clutches according to the invention, we must make $$\phi < \theta_1 - \theta \tag{6}$$

so as to assure self-locking regardless of the direction of $\theta$.

Substituting the limit condition $\theta_1 = \phi + \theta$ into Equation 3, it can be shown that the maximum efficiency attainable for Case I is 50%. (This limitation applies only to a clutch which is self-locking in both directions of rotation, but does not apply to a freewheeling or overrunning clutch, as will be explained later.) By setting the derivative $de/d\phi$ equal to zero, it is found that the efficiency $e$ will be highest provided the wedge angle $\phi$ is made $$\phi_{optimum} = 45° - \theta/2 \tag{7}$$

Figure 3:
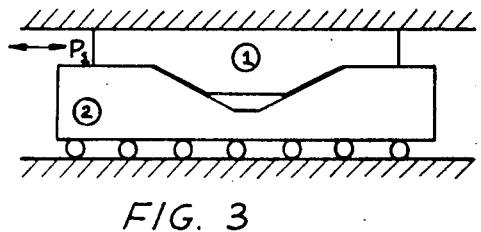
FIG. 3 is a diagram of a wedge mechanism similar to that of FIG. 1, but able to operate in both directions.

If it is desired to have the wedges operate in either direction, the mechanism must be modified as shown in FIG. 3.

In order to obtain a freewheeling or overrunning mechanism, we must design the wedges such that wedge 2 will be free to move in one direction, but will produce self-locking when attempting to move in the opposite direction. This can be achieved by the wedge mechanism shown in FIG. 4. Here, a spring has been added connecting the two wedges. If $P_2$ tries to drive to the right, the mechanism will be self-locking, provided it is designed to satisfy Equation 6. However, $P_2$ is able to drive wedge 1 to the left, since the bearing friction $F_1$ is, in this case, greatly reduced, so that self-locking does not occur. An overrunning mechanism thus results, i.e., wedge 2 is able to move to the left faster than it is being driven by wedge 1.

Figure 5:
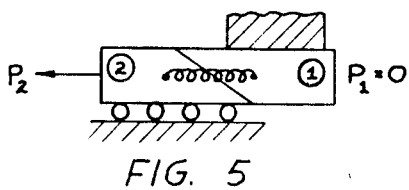
FIG. 5 is a diagram similar to FIG. 4, but with different outside forces acting on the mechanism.

If wedge 1 is not connected to any force or load (i.e., $P_1 = 0$), we have the case illustrated in FIG. 5. Wedge 2 can move freely to the left, but produces self-locking if attempting to drive to the right. A clutch based on this mechanism can be used for "backstopping" or holdback applications, and, as will be shown later, can also be utilized for overrunning or freewheeling, and for indexing applications.

Figure 6:
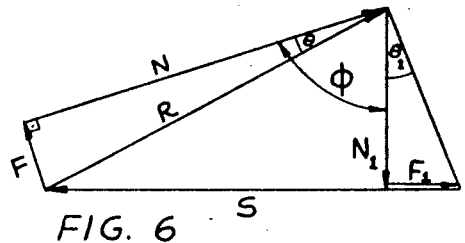
FIG. 6 is a vector diagram of the various forces acting on the wedges of FIG. 5, useful in deriving the equations that describe the invention.

For the mechanism of FIG. 5, with $P_2$ acting towards the left, the forces acting on wedge 1 are shown in the vector diagram of FIG. 6. In this diagram, S represents the spring tension, while the other letters have the same meaning as in FIGS. 1 and 2. From FIG. 5, it is seen that $$S - F_1 = N_1 \tan(\phi - \theta) = \frac{F_1}{f_1} \tan(\phi - \theta)$$

or $$S = F_1 \left[ 1 + \frac{\tan(\phi - \theta)}{f_1} \right]$$

Since $P_1 = 0$, $P_2$ must equal $F_1$, these being the only outside horizontal forces acting on the system, so that $$P_2 = S \left[ \frac{f_1}{f_1 + \tan(\phi - \theta)} \right] \tag{8}$$

If $f_1$ is made large (as explained later), then $$P_2 \approx S \tag{9}$$

This represents the limiting case. Actually, $P_2 < S$, provided $\phi > \theta$.

The spring tension S must be made large enough so that the spring will always keep the two wedges in contact, in spite of acceleration or any additional forces that might appear. As long as the spring keeps the two wedges in contact, there will be no backlash in the clutch when $P_2$ changes direction.

Once the necessary spring tension S has been decided upon, the resulting force $P_2$ is found from Equation 8. $P_2$ represents the force necessary for freewheeling, i.e., for overcoming the internal friction in the mechanism. Since we are interested in keeping this freewheeling force $P_2$ as low as possible, we should strive to make $\phi$ considerable larger than the friction angle $\theta$, so that $P_2$ will be considerably smaller than S. $\phi$ might typically be in the range between 25 and 50 degrees.

Figure 4:
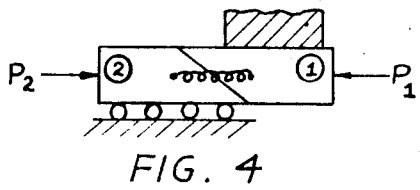
FIG. 4 is a diagram of a wedge mechanism similar to that of FIG. 1, but with a spring added between the two wedges.
Figure 7:
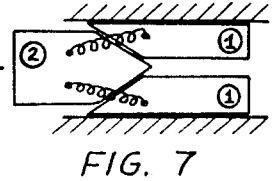
FIG. 7 is a diagram of a wedge mechanism similar to that of FIG. 4, but with the roller bearing eliminated.

FIG. 7 shows a wedge mechanism similar to that of FIG. 4, but with wedge 1 replaced by two symmetrical wedges and two separate springs. In this fashion, the need for expensive anti-friction bearings is eliminated.

It will now be shown how the above theory can be applied to rotating clutch mechanisms. In order to make a turning mechanism out of any one of the wedge mechanisms shown in FIGS. 1, 3, 4, 5 or 7, the wedges simply have to be rolled or turned back on themselves about an axis perpendicular to the guide surfaces.

Figure 9:
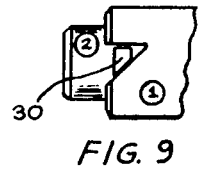
FIG. 9 shows a modification of a portion of FIG. 8.
Figure 8:
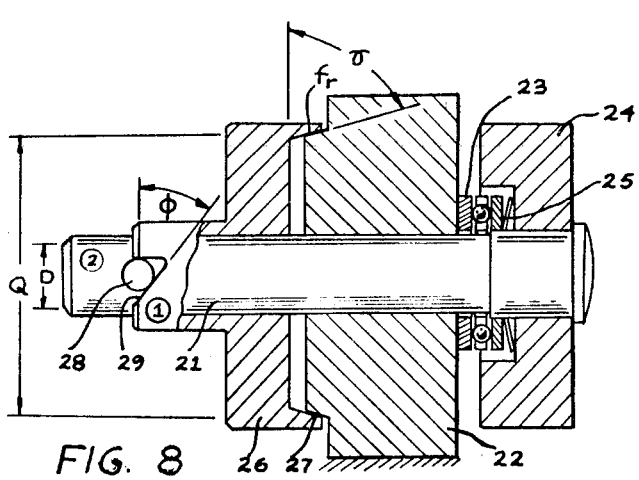
FIG. 8 is a partial-section view of a preferred embodiment of a clutch according to the invention, based on the wedge mechanism of FIGS. 1 and 4.

As an example, a clutch mechanism equivalent to the wedge mechanism of FIGS. 1 or 4 is shown in FIG. 8. Wedge body 1 is here represented by the wheel 26 with wedge surface 29 having wedge $\phi$ with respect to the direction of motion. The wheel 26 turns on thrust bearing surface 27 of fixed bearing member 22. The wedge body 2 is represented by shaft 21 with engaging pin 28 engaging wedge surface 29. (Instead of circular pin 28, a wedge-shaped engaging means 30 of FIG. 9 could also be used, having the advantage of surface contact and thus being able to transmit greater forces, although being somewhat more expensive to manufacture.)

Shaft 21 turns in bearing 22. The axial load is taken up by thrust bearing 23. Disk spring 25 is inserted between the bearing 23 and cap 24 in order to take up all free play and press wheel 26 against bearing surface 27, so that self-locking san be obtained even if the load on wheel 26 is zero.

If $f_r$ is the real friction coefficient between wheel 26 and bearing surface 27 (depending on the materials and surface finish), $\gamma$ the angle of bearing surface 27, Q the average diameter of the thrust bearing surface, and D the average diameter of wedge surface 29, then the effective friction coefficient $f_1$ felt at the wedge surface 29 due to the bearing friction will be equal to $$f_1 = \frac{f_r}{\cos \gamma} \cdot \frac{Q}{D} \qquad (10)$$

It is this friction coefficient $f_1$ and corresponding friction angle $\theta_1$=arc tan $f_1$ which must be used in Equations 2 to 6, and 8. By choosing appropriate values for the diameters Q and D and for the angle $\gamma$, the coefficient $f_1$ can be controlled and can be made appreciably greater than $f$, so that Equation 6 can be satisfied even though $\phi$ is made fairly large. (This friction coefficient $f_1$ will be referred to in the claims as the "reflected coefficient of bearing friction.")

If Equation 6 is satisfied, then wheel 26 (i.e., wedge 1) can turn shaft 21 (wedge 2) in any direction (Case I), but shaft 21 can turn wheel 26 (Case II) only in the direction wherein pin 28 moves upwards in the figure. If shaft 21 attempts to move in the opposite direction, the pin 28 will contact wedge surface 29 and press wheel 26 to the right against thrust bearing surface 27. The resulting increased friction force will produce self-locking and prevent rotation.

Figure 10:
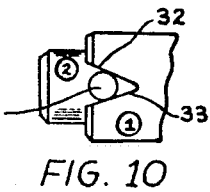
FIG. 10 shows another modification of a portion of FIG. 8, based on the wedge mechanism of FIG. 3.

FIG. 10 shows a modification of the mechanism of FIG. 8, based on the wedge mechanism of FIG. 3. Here the pin 31 engages simultaneously two wedge surfaces 32 and 33. If one wedge surface has a wedge angle $\phi$, the second wedge surface has a wedge angle 180° $-\phi$. Provided $\phi$ satisfies Equation 6, the clutch will be completely self-locking, i.e., the first shaft 1 can drive the second shaft 2 in either direction, but the second shaft cannot drive the first shaft in any direction.

Figure 12:
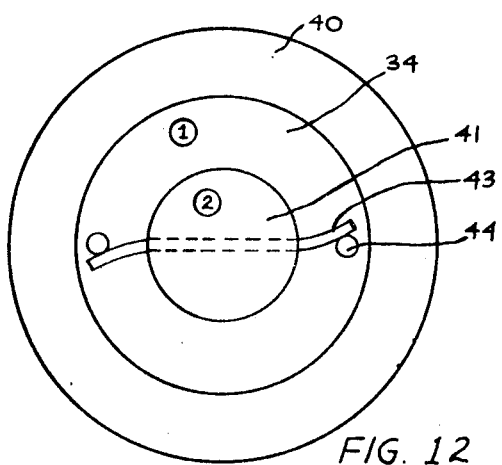
FIG. 12 is a side view of the clutch of FIG. 11.
Figure 11:
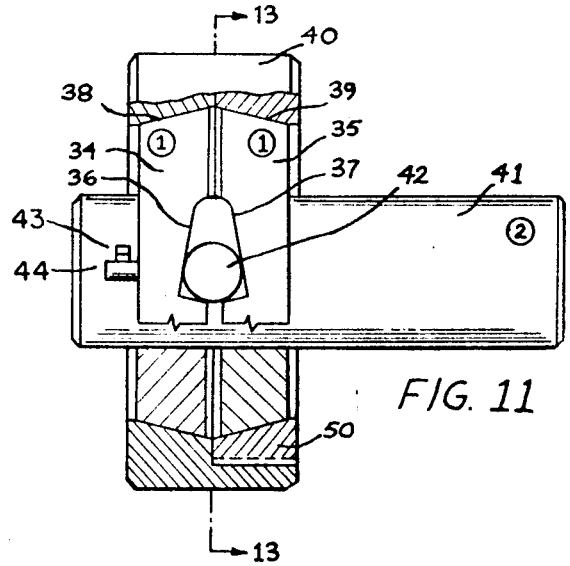
FIG. 11 is a partial-section view of a second preferred embodiment of a clutch according to the invention, based on the wedge mechanism of FIG. 7.
Figure 13:
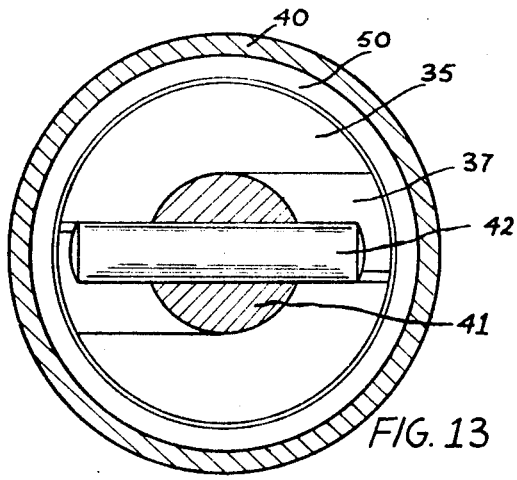
FIG. 13 is a cross-sectional view taken along the line 13—13 of FIG. 11.

FIGS. 11, 12, and 13 show a second preferred embodiment of a clutch based on the wedge mechanism of FIG. 7. By duplicating wedge body 1 in a symmetrical construction, the need for expensive anti-friction bearings is eliminated. Wedge body 1 is here represented by the two wheels 34 and 35, having wedge surfaces 36 and 37. The wheels 34 and 35 turn on thrust bearing surfaces 38 and 39 respectively of bearing member 40. It will be understood that wheels 34 and 35 can be directly connected to a concentric driving shaft, or that they can be extended axially so as to constitute a pulley or a toothed wheel, whereby 1 can become the driving body. The pins 44, possibly extended, could even be used to turn wheels 34 and 35. The wedge body 2 is represented by shaft 41 with engaging pin 42 engaging both wedge surfaces 36 and 37. As with the mechanism of FIG. 8, the pin 42 could be replaced by a wedge-shaped engaging member, analogous to that shown in FIG. 9. In this way, line contact would be replaced by surface contact, so that greater loads could be transmitted. Instead of a disk spring as in FIG. 8, the clutch of FIG. 11 uses a leaf spring 43 pressing against two stops 44 inserted on the side of wheel 34, in order to eliminate backlash. Conical threaded part 50 is screwed into bearing member 40, its purpose being to facilitate assembly of the device.

Provided the wedge angles of wedge surfaces 36 and 37 satisfy Equation 6, either of wheels 34 or 35 can drive shaft 41 in either direction, but shaft 41 can only drive wheels 34 and 35 in a direction so that pin 42 moves downwards in the figure. If pin 42 attempts to drive upwards, the wheels 34 and 35 will be pressed against the bearing surfaces 38 and 39 respectively, and the clutch will be locked.

Figure 14:
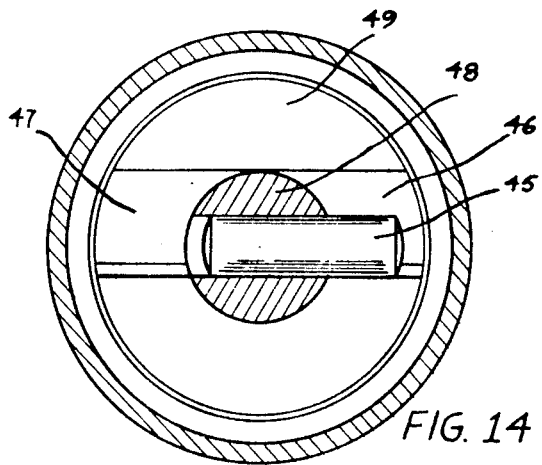
FIG. 14 is a cross-sectional view similar to that of FIG. 13, but according to another modification of the invention.

FIG. 13 shows a cross-sectional view taken along the line 13—13 of FIG. 11. FIG. 14 shows a different cross-sectional view, taken along the same line 13—13 but for a different modification of the clutch. The pin 45 is somewhat shorter than the pin 42 of FIG. 13, and only contacts one of the two wedge surfaces 46 or 47. In the position shown, the shaft 48 and pin 45 can drive wheel 49 freely in the clockwise direction, but the clutch becomes self-locking if the pin 45 attempts to drive in the counter-clockwise direction. If it is desired to switch the direction in which self-locking takes place, it is only necessary to punsh the pin 45 to the left so that it contacts wedge surface 47 instead of 46.

Figure 15:
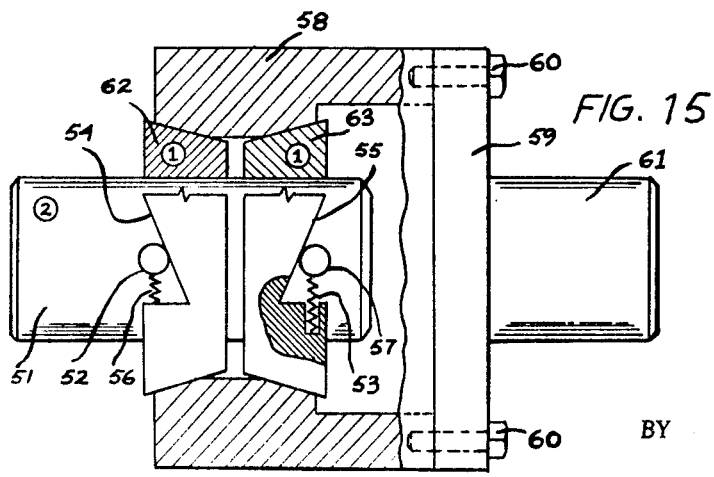
FIG. 15 is a partial-section view of a clutch which is another variation of the clutch in FIG. 11, and which also illustrates an adaptation of the clutch mechanism for an overrunning application.

In order to avoid the necessity of using the conical threaded part 50 of FIG. 11, the design shown in FIG. 15 can be utilized. Here, the shaft 51 carries two engaging pins 52 and 57 engaging the two wedge surfaces 54 and 55 respectively. Otherwise, the theory and operation of this clutch is identical to that of FIG. 11. FIG. 15 is also utilized to illustrate an alternative spring design. Instead of the leaf spring 43 of FIG. 12, helical coil springs 53 and 56 are used in order to avoid backlash.

FIG. 15 is also utilized to illustrate a different application for the clutch. In this application, bearing member 58 is not fixed, but is connected by means of flange 59 and screws 60 to shaft 61. As long as shaft 51 turns in a direction causing pins 52 and 57 to move upwards in the figure, the wheels 62 and 63 are pressed against bearing member 58 and the clutch becomes self-locking, i.e., there is no relative motion between wheels 62 and 63 on one hand and bearing member 58 on the other. The shafts 51 and 61 will therefore be rigidly connected and rotate as one unit, and the clutch will thus transmit power without any loss whatsoever. If, however, shaft 51 turns in the opposite direction, the clutch is not self-locking but permits relative motion between wheels 62, 63 and bearing member 58, so that no power whatsoever can be transmitted. In this direction, the shaft 51 will therefore be freewheeling. This clutch will therefore be suitable for overrunning or indexing applications.

By comparison, the clutch of FIG. 11 illustrates a backstopping or holdback application, such as used as safety devices on gear reducers, conveyor belts, etc. Here, the conveyor might be connected to shaft 41, with bearing member 40 fixed, and nothing connected to wheels 34 and 35. The shaft 41 can then free-wheel in one direction, but is absolutely prevented from rotating in the opposite direction, so that the conveyor belt cannot slide back under load. Since the purpose of this device is not to transmit any power, and since there is no outside load $P_1$ on wheels 34 and 35, the efficiency Equation 4 is not relevant here.

It will be obvious that any one of the clutches illustrated in FIGS. 8, 11 and 15 can be used for any one of the applications described above, simply by either releasing or holding fixed the relevant parts.

The advantages of the clutch will now be clear. Not only does the clutch consist of a very small number of parts, but these parts are all simple and inexpensive to manufacture. By using a spring, backlash can be virtually eliminated. If desired, surface contact can be substituted for line contact, so that large torques can be transmitted. Futhermore, by means of slight modifications, the clutch can easily be adapted to a number of different applications. Thus, the direction of self-locking can be switched, and the clutch can be used to carry out backstopping, overrunning or freewheeling, and ordinary self-locking functions.

It is to be understood that the forms of the invention here described are to be taken as preferred embodiments. Various changes may be made in the shape and arrangement of parts, and equivalent elements may be substituted for those described, all without departing from the spirit or scope of the invention as defined in the subjoined claims.

Having thus described my invention, what I claim as new and desire to secure by Letters Patent is:

1. A clutch mechanism comprising: a pair of rotating members adapted to transmit torque and to rotate coaxially with each other, and substantially symmetrical to each other about a plane of symmetry perpendicular to their axis of rotation, each member having a conical outer surface, and a wedge surface angularly disposed to the direction of rotation and thus defining a wedge angle $\phi$; a pair of conical thrust-bearing friction surfaces adapted to engage respectively the two conical outer surfaces of said pair of rotating members with a coefficient of sliding friction between them, said sliding friction producing a reflected coefficient of bearing friction $f_1$ at said wedge surfaces; and a third rotating member adapted to transmit torque, rotating coaxially with said pair of rotating members and including pin-shaped engaging means adapted to engage each wedge surface simultaneously with a coefficient of sliding friction $f$, and adapted to transmit rotation between said third rotating member and said pair of rotating members; and wherein said wedge angle $\phi$ is smaller than the difference (arc tan $f_1$—arc tan $f$), whereby said third rotating member cannot produce relative rotation with respect to said pair of rotating members in a direction tending to press them against said conical thrust-bearing friction surfaces.

2. A clutch mechanism according to claim 1, wherein each of said pair of rotating members further comprises a second wedge surface angularly disposed to the direction of rotation and having a wedge angle substantially equal to 180°—$\phi$, said second wedge surface being adapted to contact said engaging means when the direction of rotation is changed, said engaging means contacting either one of said two wedge surfaces depending on the direction of rotation, whereby said third rotating member cannot drive said pair of rotating members in any direction.

3. A clutch mechanism according to claim 1, further comprising a spring member adapted to transmit motion between said third rotating member and said pair of rotating members, whereby backlash is substantially eliminated.

4. A clutch mechanism according to claim 1, wherein said engaging means comprises two separate pins, each of which being adapted to engage one of said wedge surfaces.

5. A clutch mechanism according to claim 4, further comprising first and second spring members adapted to transmit motion between third rotating member and said pair of rotating members respectively, whereby backlash is substantially eliminated.

6. A clutch mechanism according to claim 1, wherein each of said pair of rotating members has a second wedge surface identical to said first wedge surface and lying in the same plane, and wherein said engaging means is adapted to be shifted 180 degrees to the opposite side of said pair of rotating members and thus come into engagement with said second wedge surface, whereby the direction of rotation in which locking occurs is switched.

7. A clutch mechanism according to claim 1, wherein said wedge angle $\phi$ is substantially equal to 45 degrees minus ½ arc tan $f$.

8. A clutch mechanism according to claim 1, further comprising a shaft adapted to rotate and rigidly connected to said conical thrust bearing.

References Cited

UNITED STATES PATENTS

| | | | |
|---|---|---|---|
| 362,084 | 5/1887 | Hubbard | 192—41 |
| 710,757 | 10/1902 | Hitt et al. | 188—82.9 |
| 860,705 | 7/1907 | Towler | 188—82.9 |
| 984,523 | 2/1911 | Baer | 192—41 |
| 1,261,245 | 5/1918 | Krause | 188—82.9 |
| 1,928,191 | 9/1933 | Meurs | 192—41 X |
| 2,349,925 | 5/1944 | Andreau | 192—41 |
| 2,675,898 | 5/1954 | Morgan | 192—41 |
| 2,873,833 | 2/1959 | Hogan | 192—41 |
| 3,092,227 | 6/1963 | Dossier | 192—41 |

BENJAMIN W. WYCHE III, Primary Examiner

U.S. Cl. X.R.

192—8; 198—67, 82.9